(12) United States Patent
Johnson et al.

(10) Patent No.: US 8,419,181 B2
(45) Date of Patent: Apr. 16, 2013

(54) CURVED LENSES CONFIGURED TO DECODE THREE-DIMENSIONAL CONTENT

(75) Inventors: David A. Johnson, Del Mar, CA (US); James Pritts, Emerald Hills, CA (US)

(73) Assignee: MEI 3D, LLC, Melville, NY (US)

( * ) Notice: Subject to any disclaimer, the term of this patent is extended or adjusted under 35 U.S.C. 154(b) by 0 days.

(21) Appl. No.: 13/454,982

(22) Filed: Apr. 24, 2012

(65) Prior Publication Data
US 2012/0247653 A1 Oct. 4, 2012

Related U.S. Application Data

(63) Continuation of application No. 13/103,037, filed on May 6, 2011, now Pat. No. 8,182,085, which is a continuation of application No. 12/495,754, filed on Jun. 30, 2009, now Pat. No. 7,946,703, which is a continuation-in-part of application No. 12/350,092, filed on Jan. 7, 2009, now Pat. No. 7,950,798.

(60) Provisional application No. 61/019,545, filed on Jan. 7, 2008.

(51) Int. Cl.
*G02C 7/12* (2006.01)

(52) U.S. Cl.
USPC ............... 351/49; 351/159.56; 359/485.03; 359/487.07; 264/1.32

(58) Field of Classification Search ............ 351/41, 351/44, 49, 159.56, 159.57, 159.58, 159.6, 351/159.62; 359/464, 485.03, 487.05, 189.02, 359/489.07, 489.19; 264/1.32
See application file for complete search history.

(56) References Cited

U.S. PATENT DOCUMENTS

| | | | |
|---|---|---|---|
| 2,099,694 A | 12/1937 | Land | |
| 2,431,942 A | 12/1947 | Land | |
| 4,564,408 A | 1/1986 | Crumbach et al. | |
| 4,877,307 A | 10/1989 | Kalmanash | |

(Continued)

FOREIGN PATENT DOCUMENTS

| | | |
|---|---|---|
| CN | 1621910 A | 1/2005 |
| EP | 0299509 A2 | 1/1989 |

(Continued)

OTHER PUBLICATIONS

Bennett, Jean M. et al., Handbook of Optics, Section 10: Polarization, 10-1, 10-102, Paragraph 56, Walter G. Driscoll & William Vaughan eds., 1978, 14 pages.

(Continued)

*Primary Examiner* — Huy K Mai
(74) *Attorney, Agent, or Firm* — Kilpatrick Townsend & Stockton LLP

(57) ABSTRACT

Curved lenses configured to decode three dimensional content and method of fabricating the same. The lenses comprise a polyvinylalcohol polarizer film or similar type of material laminated with triacetate or similar type material on one or both sides, wherein the polarizer film has a polarizing efficiency equal to or exceeding 99% and a transmittance percentage equal to or exceeding 35% and a retarder film (e.g., norbornene copolymer resin) laminated on a front surface of the polyvinylalcohol polarizer film laminated with triacetate and aligned to produce a desired circular polarization responsive to specified retardation wavelengths. Thermoforming and press polishing techniques may be used to fabricate/curve the blanks into lenses. The lenses (optical elements) may be used in an injection molding process to add thickness.

14 Claims, 7 Drawing Sheets

U.S. PATENT DOCUMENTS

| | | | |
|---|---|---|---|
| 5,321,443 | A | 6/1994 | Huber et al. |
| 5,458,820 | A | 10/1995 | Lefebvre |
| 5,598,231 | A | 1/1997 | Lin |
| 5,702,813 | A | 12/1997 | Murata et al. |
| 5,751,481 | A | 5/1998 | Dalzell et al. |
| 5,805,336 | A | 9/1998 | Dalzell et al. |
| 5,997,139 | A | 12/1999 | Yasuda |
| 6,162,376 | A | 12/2000 | Mead |
| 6,177,032 | B1 | 1/2001 | Smith et al. |
| 6,367,930 | B1 | 4/2002 | Santelices et al. |
| 6,786,599 | B2 * | 9/2004 | Hayashi .................. 351/159.56 |
| 6,801,360 | B2 | 10/2004 | Phillips |
| 6,951,681 | B2 | 10/2005 | Hartley et al. |
| 7,036,932 | B2 | 5/2006 | Boulineau et al. |
| 7,077,985 | B2 | 7/2006 | Maki et al. |
| 7,289,257 | B1 | 10/2007 | Hakagoshi |
| 7,517,081 | B2 | 4/2009 | Lipton et al. |
| 7,524,053 | B2 | 4/2009 | Lipton |
| 7,854,506 | B1 | 12/2010 | Johnson et al. |
| 7,946,703 | B2 * | 5/2011 | Johnson et al. .......... 351/159.59 |
| 7,950,798 | B2 * | 5/2011 | Johnson et al. .......... 351/159.59 |
| 7,964,121 | B2 | 6/2011 | Hsu |
| 8,100,525 | B2 | 1/2012 | Johnson et al. |
| 8,182,085 | B2 * | 5/2012 | Johnson et al. ................. 351/49 |
| 8,337,012 | B2 | 12/2012 | Johnson et al. |
| 2006/0285026 | A1 | 12/2006 | Robinson |
| 2007/0236809 | A1 | 10/2007 | Lippey |
| 2007/0263169 | A1 | 11/2007 | Lipton |
| 2008/0278807 | A1 | 11/2008 | Richards et al. |
| 2009/0097117 | A1 | 4/2009 | Coleman |
| 2011/0090454 | A1 | 4/2011 | Johnson et al. |
| 2012/0050858 | A1 | 3/2012 | Johnson et al. |
| 2012/0147466 | A1 | 6/2012 | Johnson et al. |

FOREIGN PATENT DOCUMENTS

| | | |
|---|---|---|
| EP | 0505998 A2 | 9/1992 |
| JP | 2010 151954 A2 | 7/2010 |
| KR | 100720732 B1 | 5/2007 |
| WO | WO 2007-008777 A2 | 1/2007 |
| WO | WO 2010/032897 A2 | 11/2010 |
| WO | WO 2011/002897 A2 | 1/2011 |
| WO | WO 2011/050176 A2 | 4/2011 |

OTHER PUBLICATIONS

International Search Report and Written Opinion of the International Searching Authority in related International Application No. PCT/US09/030345 dated Sep. 30, 2009, 6 pages.

International Search Report and Written Opinion of the International Searching Authority in related International Application No. PCT/US10/040622 dated Feb. 9, 2011, 8 pages.

International Search Report and Written Opinion of the International Searching Authority in related International Application No. PCT/US10/035166 dated Dec. 23, 2010, 7 pages.

Request for ReExamination from related U.S. Appl. No. 12/604,155, now U.S. Patent No. 7,584,506, 170 pages.

Office Action for corresponding Chinese application No. CN200980107287.5 dated Aug. 18, 2011, 5 pages.

Office Action for corresponding Chinese application No.CN200980107287.5 dated Feb. 21, 2012, 6 pages.

Office Action for corresponding Chinese application No. CN200980107287.5 dated Jun. 28, 2012, 7 pages.

Notification of the Grant of Patent Right for Invention for corresponding Chinese application No. CN200980107287.5 dated Oct. 31, 2012, 5 pages.

Non-Final Office Action for U.S. Appl. No. 12/350,092 mailed on Jun. 7, 2010, 7 pages.

Non-Final Office Action for U.S. Appl. No. 12/495,754 mailed on Jun. 14, 2010, 8 pages.

Notice of Allowance for U.S. Appl. No. 12/604,155 mailed on Oct. 7, 2010, 10 pages.

Notice of Allowance for U.S. Appl. No. 12/350,092 mailed on Feb. 7, 2011, 6 pages.

Notice of Allowance for U.S. Appl. No. 12,495,754 mailed on Feb. 11, 2011, 7 pages.

Non-Final Office Action for U.S. Appl. No. 12/973,620 mailed on Apr. 19, 2011, 7 pages.

Non-Final Office Action for U.S. Appl. No. 12/781,590 mailed on Dec. 23, 2011, 19 pages.

Notice of Allowance for U.S. Appl. No. 13/103,037 mailed on Jan. 31, 2012, 7 pages.

Final Office Action for U.S. Appl. No. 12/781,590 on May 25, 2012, 19 pages.

Notice of Allowance for U.S. Appl. No. 13/323,725 mailed on Aug. 23, 2012, 8 pages.

"Polarized 3D Glasses by 3D Glasses Direct" downloaded from Internet http://russian.circular-polarized-3dglasses.com, on Dec. 12, 2012, 1 page.

"New Circular Polarized 3d Glasses—Buy Polarized 3d Glasses", downloaded from Internet http://alibaba.com/product-gs/314540818/New_Circular_Polarized_3D_... On Dec. 18, 2012, 3 pages.

Office Action for corresponding Eurasian application No. 201070830 dated Dec. 18, 2012, 2 pages.

Notice of Allowance for U.S. Appl. No. 13/103,036 mailed on Jan. 1, 2013, 7 pages.

* cited by examiner

| CHECKPOINT | | UNIT | SPECIFIED VALUE | ACTUAL VALURE |
|---|---|---|---|---|
| DIMENSIONS | WIDTH | MM | 495 ~ 505 | 495 |
| | LENGTH | MM | 700 ~ 710 | 700 |
| RETARDATION | θP | ' | 0.0 ± 1.0 | -0.1 |
| | R | NM | ------- | ------- |
| | θR2 | ' | 45.0 ± 1.0 | 45.1 |
| HUE | L | | 64.0 ± 16.0 | 63.8 |
| | A | | -1.40 ± 2.50 | -1.70 |
| | B | | 2.10 ± 2.50 | 2.73 |
| SINGLE TRANSMITTANCE | | % | 40.00 ± 2.50 | 41.77 |
| POLARIZING EFFICIENCY | | % | 99.80 | 99.96 |
| THICKNESS | | μM | 1050.0 ± 30.0 | 1046.0 |
| PEEL STRENGTH OF RELEASE FILM | | GF/25MM | ------- | ------- |
| CURL | | MM | -50.0 ≥ x ≤ +50.0 | 1.0 |
| UV-CUT | | % | 1.000 | 0.020 |
| HEAT RESISTANCE | | | 70°C / DRY / 240 HRS. | PSSED |
| HUMIDITY RESISTANCE | | | 40°C / 95%RH / 240 HRS | PSSED |
| APPEARANCE QUALITY | | | ------- | PSSED |

FIG. 1

| ITEM | UNIT | DATA | STANDARD | | OK/NG |
|---|---|---|---|---|---|
| | | | SL | SU | |
| DIMENSION A | MM | 963.0 | 938.0 | 978.0 | |
| DIMENSION B | MM | 503.0 | 480.0 | 520.0 | |
| POLARIZING AXIS α | · | 0.0 | -1.5 | 1.5 | |
| LATE RITADATION AXIS β | · | 45.1 | 43.5 | 46.5 | |
| RITADATION | NM | 122.7 | 110.0 | 130.0 | |
| THICKNESS | μM | 882.0 | 800.0 | 1000.0 | |
| POLARIZER SIDE PROTECT FILM DETACHMENT POWER | N/25MM | 0.03 | - | 0.98 | |
| RITADATION FILM SIDE PROTECT FILM DETACHMENT POWER | N/25MM | 0.03 | - | 0.98 | |
| | | | | | |
| | | | | | |
| | | | | | |
| | | | | | |

FIG. 4

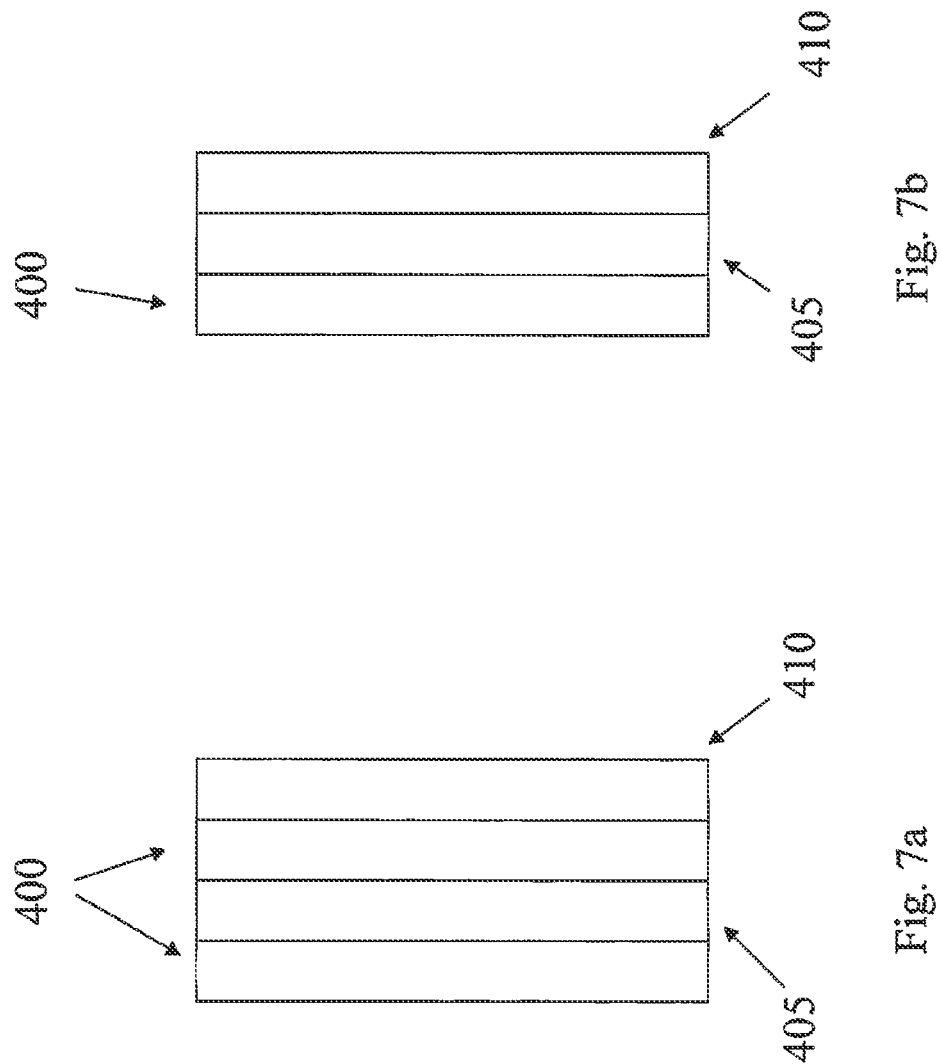

CURVED LENSES CONFIGURED TO DECODE THREE-DIMENSIONAL CONTENT

CROSS-REFERENCES TO RELATED APPLICATIONS

This application is a continuation of U.S. patent application Ser. No. 13/103,037, filed on May 6, 2011, which is a continuation of U.S. patent application Ser. No. 12/495,754, filed on Jun. 30, 2009, which is a continuation-in-part of U.S. patent application Ser. No. 12/350,092, filed on Jan. 7, 2009, which claims the benefit of U.S. Provisional Patent Application No. 61/019,545 filed Jan. 7, 2008. the disclosures of which are hereby incorporated by reference in their entirety for all purposes.

FIELD OF THE INVENTION

The embodiments of the present invention relate to lenses designed to decode three dimensional content displayed on television, movie, computer or similar screens or monitors.

BACKGROUND OF THE INVENTION

Three dimensional movies for theatres have been around for decades. With technological advances, three dimensional content is being developed for television, computer monitors and home projectors. In the past, and even today, special glasses allow users to view three dimensional content. Flat paper eyeglasses using red and green film for lenses are the primary glasses being used today. However, flat paper eyeglasses are not very effective for facilitating the desired three dimension effect. In addition, the flat paper eyeglasses are not comfortable and are generally viewed as a novelty. Other flat lenses suffer from the same drawbacks.

One advancement has been the development of linear and circular polarization for decoding three dimensional content. Despite the advancement, the lens and eyeglass technology has not advanced significantly.

Thus, there is a need for lenses that take advantage of the linear and circular polarization technologies while more effectively creating the desired three dimensional effect. Advantageously, the lenses and eyeglasses should provide improved optics and contrast while providing user comfort and versatility. It is also beneficial if the lenses may be mounted into stylish frames.

SUMMARY OF THE INVENTION

Accordingly, one embodiment of the present invention is a curved lens configured to decode three dimensional content comprising: a polarizing layer laminated with a polymeric material layer on one or both sides; a retarder layer laminated to a front of the polarizer layer directly or to the polymeric material to form a sheet, said retarder layer aligned to decode a desired circular polarization; and wherein a blank cut from the sheet is curved using a thermoforming process or high pressure process into a lens configured to decode three dimensional content.

Another embodiment is a lens configured to decode three dimensional content comprising: a polarizing layer laminated with a polymeric material layer on one or both sides; a retarder layer laminated to a front of the polarizer layer directly or to the polymeric material to form a sheet, said retarder layer aligned to decode a desired circular polarization; wherein a blank cut from the sheet is curved using a thermoforming process or high pressure process into an optical element configured to decode three dimensional content; and wherein said optical element is utilized in an injection molding process whereby one or more thickness layers are added to the optical element to form said lens.

Another embodiment of the present invention is a method of fabricating a curved lens configured to decode three dimensional content comprising: cutting lens blanks from sheets of material comprising: a polarizing layer laminated with a polymeric material layer on one or both sides; a retarder layer laminated to a front of the polarizer layer directly or the polymeric material, said retarder layer aligned to decode a desired circular polarization, and wherein said blanks are cut to maintain a specified alignment of a polarizing axis associated with said sheet; curving said blanks into lenses by: a. heating the blanks to a deformation temperature; and applying a vacuum suction and/or pressure; or b. applying high pressure.

In one embodiment, the retarder is a norbornene copolymer resin such as an Afton film (manufactured by JSR Corp.) or Zenor film (manufactured by Zeon corp.). Conventional adhesives (e.g., pressure sensitive adhesives) are used to bond the layers forming the lens. In one embodiment, a hard coating is applied to the front and back surfaces of the lens to allow for normal cleaning and extended life. In one embodiment, a lens thickness is between 750 and 1500 microns. In another embodiment, the lens thickness is between 250 and 1500 microns.

Other variations, embodiments and features of the present invention will become evident from the following detailed description, drawings and claims.

BRIEF DESCRIPTION OF THE DRAWINGS

FIGS. 1 and 2 illustrate an exemplary specification sheet for a first lens embodiment of the present invention;

FIGS. 3 and 4 illustrate an exemplary specification sheet for a second lens embodiment of the present invention;

FIGS. 7a and 7b illustrate cross-sectional views of the lenses according to the embodiments of the present invention.

DETAILED DESCRIPTION OF THE INVENTION

Figure 2:
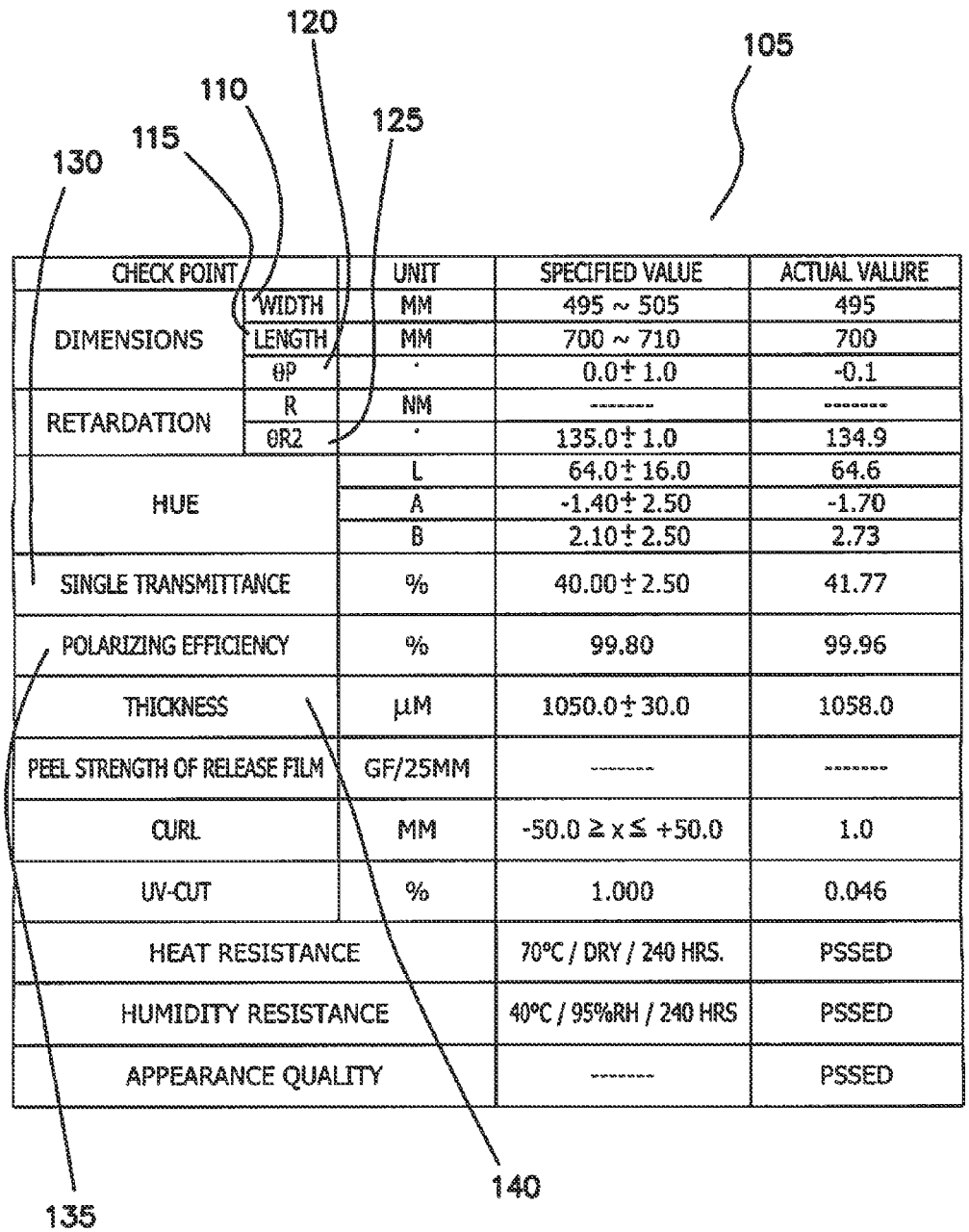
Figure 3:
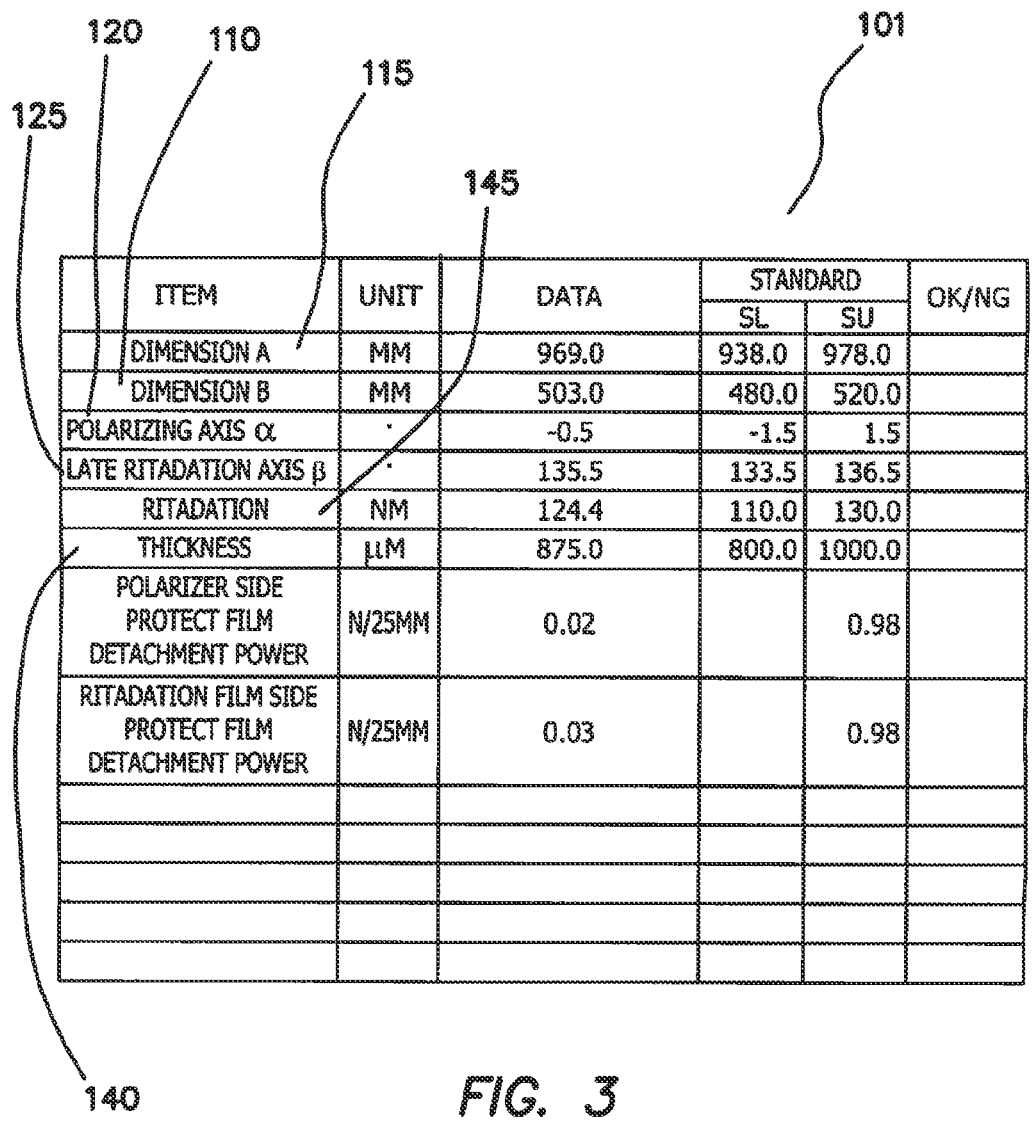

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Traditionally flat lenses and frames have been used in 3D glasses. One problem with the flat 3D glasses is that the lenses are distanced from the user's face and more particularly the user's eyes. Thus, light is able to enter the user's eyes from the top, bottom and side of the lenses reducing the visual acuity and contrast thereby reducing the effectiveness and comfort of the 3D experience. This is especially true at home or other locations outside of dark movie theatres. Moreover, the current one-size-fits-all approach to flat 3D eyeglasses reduces the quality of the 3D experience and in many cases results in an uncomfortable fit for most users. Accordingly, the embodiments of the present invention seek to overcome the disadvantages of the prior art flat 3D eyeglasses by creating 3D lenses and eyeglasses which are more akin to normal curved lenses and eyeglasses. Consequently, the lenses described herein are generally thicker than traditional flat 3D lenses and curved to prevent ambient light from interfering with the 3D experience and allow for better fitting glasses. Conventional flat 3D paper lenses are 0.3 to 0.4 mm thick while the embodiments of the present invention are substantially in a range of 0.75 mm to 1.5 mm. In an alternative embodiment, the lenses may be in range of 0.25 mm to 0.75 mm for use with an injection molding process as described below. The curvature further enables a better fit on the user's head. In addition, the thicker lenses enable them to be mounted into stylish frames to which people are more accustomed.

FIGS. 1-4 show specifications associated with lenses made utilizing the embodiments of the present invention. FIGS. 1 and 2 depict charts 100 and 105 listing lens specifications according to a first embodiment. The charts 100 and 105 depict dimensions, including width 110 and length 115, polarization angle 120, retardation angle 125, transmittance percentage 130, polarizing efficiency 135, thickness 140 and retardation 145. As shown in charts 100 and 105, the width ranges from 495 mm to 505 mm; length from 700 mm to 710 mm; polarization angle from −1.0 degree to 1.0 degree; retardation angle from 44.0 degrees to 46.0 degrees (or 134 degrees to 136 degrees); transmittance percentage from 37.5% to 42.5%; polarizing efficiency of 99% or greater; thickness of 1020 microns to 1080 microns (or 1.02 mm to 1.08 mm) and retardation of 110 to 150 nm. Larger ranges are possible for each of the aforementioned categories. Charts 101 and 106 shown in FIGS. 3 and 4, respectively, depict similar lens specifications according to a second embodiment of the present invention.

Figure 5:
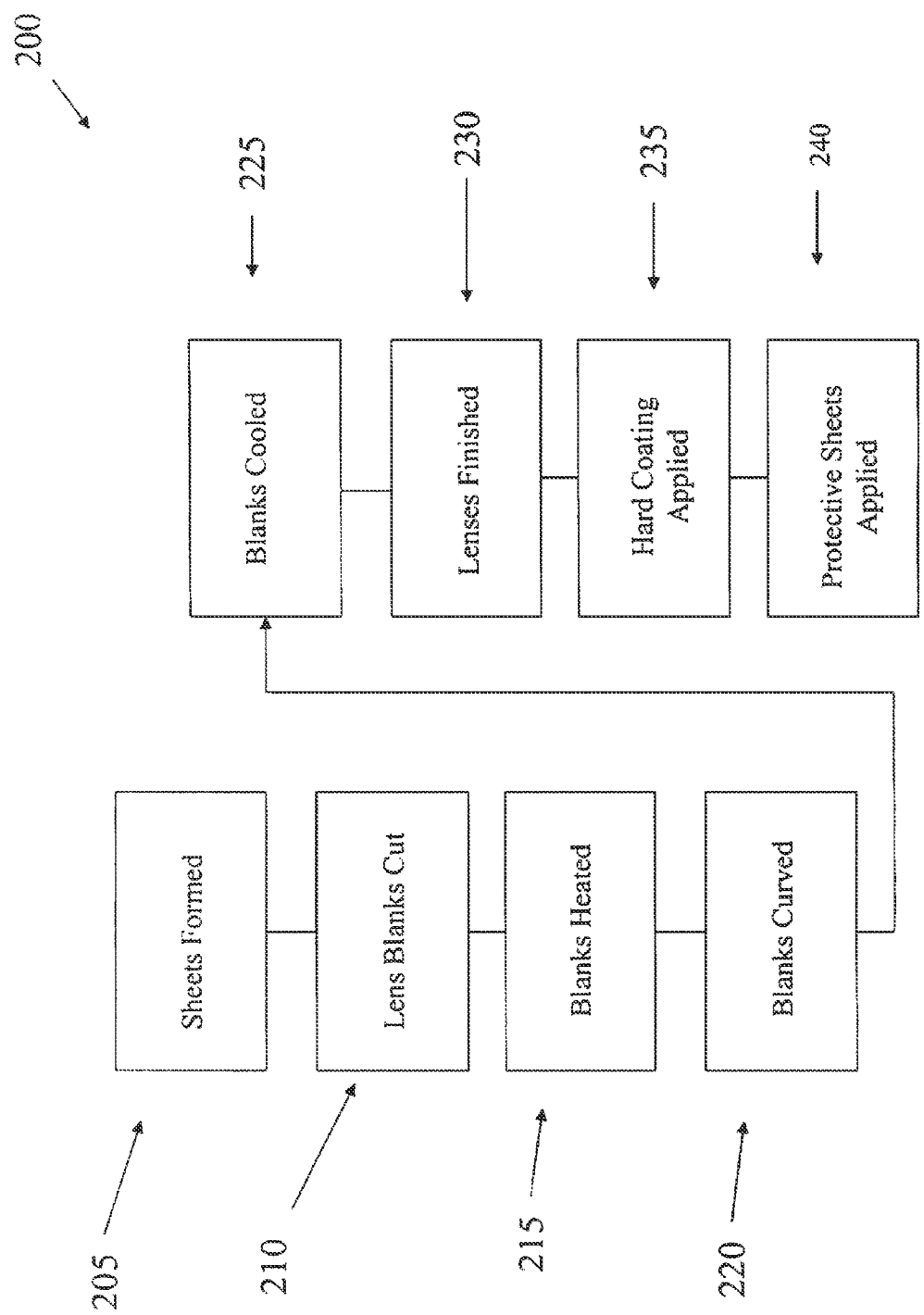
FIG. 5 illustrates a flow chart detailing one embodiment of manufacturing the lenses according to the embodiments of the present invention.

Fabrication of the lenses is accomplished using lamination and thermoforming techniques. FIG. 5 shows a flow chart 200 detailing one method of fabricating lenses according to the embodiments of the present invention. At 205, sheets are formed and, at 210, lens blanks are cut from the sheets of material comprising: polyvinylalcohol polarizer film, polyethyleneterephthalate or similar material laminated with triacetate on one or both surfaces (i.e., linear polarized film) and a retarder film laminated on a front surface thereof creating a circular polarized film. While triacetate is one material that can be used, others include polycarbonate, poly(methyl methacrylate), polystyrene, polyamide, cellulose acetate butyrate (CAB), cellulose acetate, cellulose diacetate (DAC) or cellulose triacetate (TAC), diacetate and similar stress-free (no birefringence) materials. The triacetate, diacetate or other materials may also be laminated onto the back (bottom) of the polarizer film to eliminate any unwanted retardation effects. A laminator machine forms the sheets of materials such that the axis of the polarizing film and retarder film are aligned properly to small tolerances. In one embodiment, the retarder is an Afton film (manufactured by JSR Corp.) or Zenor (manufactured by Zeon corp.). Other materials, such as polyurethanes, cellulose diacetate and polycarbonates, may also be used as the retardation film. Adhesives bind the materials together. The size of the blanks is dictated by the intended frame size. A typical size is 50 mm.times.70 mm. At 215, the blanks are placed into a thermoforming machine which heats the blanks to a deformation temperature (e.g., 90° C. to 130° C.). At 220, the heated blanks are curved using thermoforming techniques to an optically correct curved surface utilizing vacuum suction and/or pressure. To generate the desired base curve (e.g., 4, 6 and 8), a different combination of unique temperatures and times may be required. Once formed, at 225, the curved blanks are cooled and removed from the machine. At 230, the blanks, now lenses, can be finished with conventional lens dry cutting machines. At 235, a hard coating is applied over the curved lenses. The hard coating allows normal cleaning and extended use while protecting the operational materials forming the lenses. The hard coat may also be applied prior to the thermoforming process by using a thermoformable hard coat material. At 240, protective, removable sheets are applied to protect the lenses during subsequent operations including installation into frames, packaging and shipping. The protective sheets may also be applied to the sheets of the material prior to thermoforming process.

While thermoforming techniques are referenced in the flow chart 200, extreme pressures may also be used to create the curved lenses. A machine known as the Wheel or similar machines generate extreme pressures and can be used to curve a blank into a lens. The process is known as press polishing whereby heat and pressure are applied to the blank via both sides of highly polished molds.

The triacetate and diacetate may comprises multiple layers themselves and have qualities, including transparency, low birefringence, lightweight and strength. Moreover, triacetate and diacetate are responsive to lamination and thermoforming processes and techniques as disclosed herein.

For the circular polarized lenses utilized in the embodiments of the present invention the polyvinylalcohol polarizer film is tinted and stretched in a linear direction to orient the polymer molecules. Polyiodine molecules are commonly used to allow polarizing efficiency and transmission to reach acceptable levels (e.g., >99% and >35%, respectively). Alternatively, dichroic dyes can be used to provide improved resistance to heat and humidity, but may have slightly lower polarizing efficiency and transmission. Both embodiments can produce the desired 3D decoding effect.

The curved lenses disclosed herein have numerous advantages over the flat 3D glasses of the prior art. The curved lenses provide a clearer and natural vision of 3D images with greater acuity and contrast. More particularly, the curved lenses reduce light entering the user's eyes from the side, top or bottom of the eyeglass frames thereby increasing the comfort and contrast associated with the viewed 3D images. The curved lenses can be fitted into commercial eyeglass frames to create a stylish pair of eyeglasses.

Figure 6:
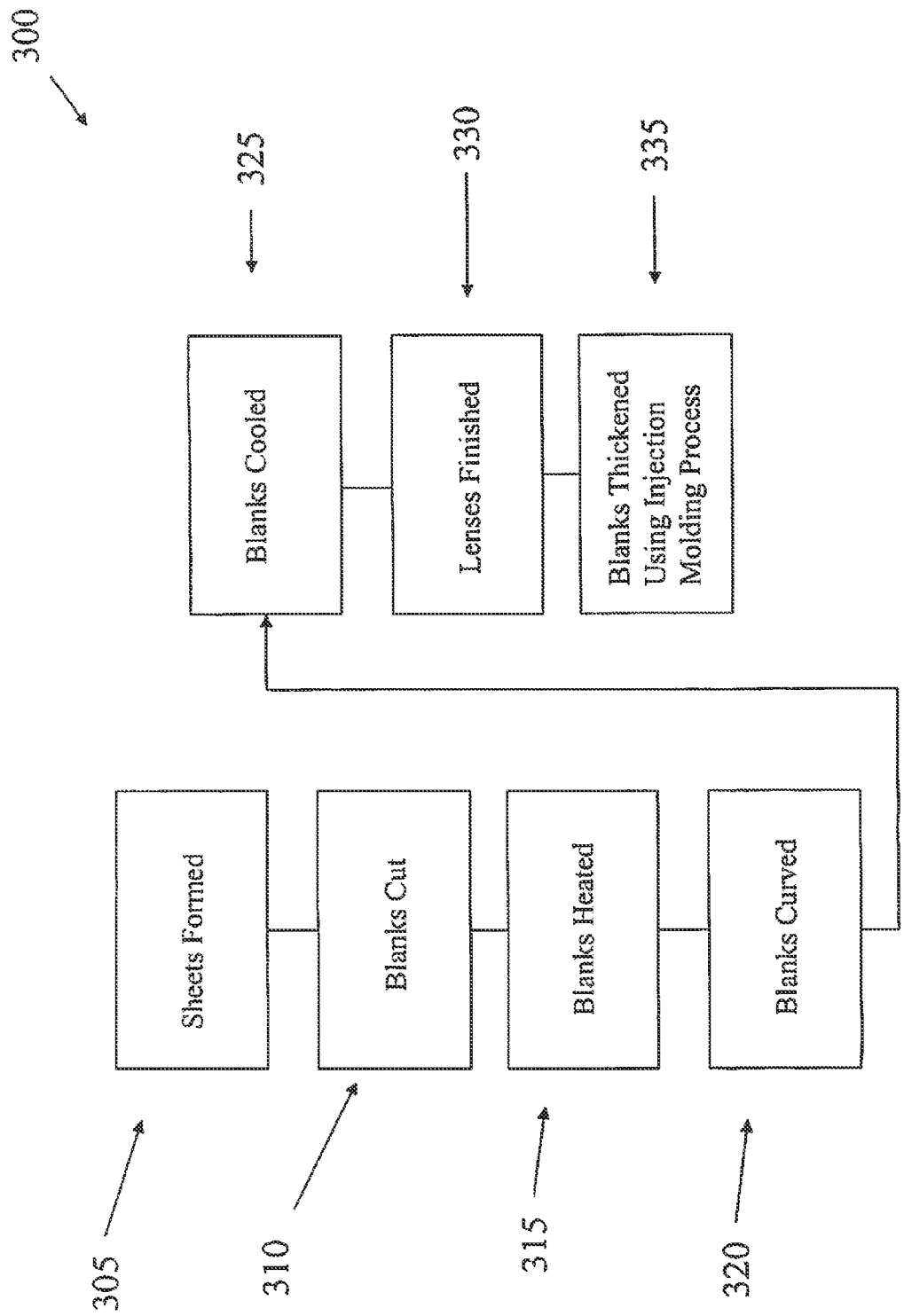
FIG. 6 illustrates a flow chart detailing a second embodiment of manufacturing the lenses according to the embodiments of the present invention.

In another embodiment, as shown in the flow chart 300 of FIG. 6, an optical element is made using the aforementioned process for use in an injection molded lens. Steps 305-330 coincide with steps 205-230 described above except that the resultant blanks are thinner than the lenses formed using the steps of flow chart 200. At 335, the blank becomes part of the final thicker lenses via an injection molding process. In other words, a thinner version of the lens described above is used as an optical element to make low cost injection molded polycarbonate (or polymethylmethacrylate and polymide) lenses. In this embodiment, the thermoformed optical elements are in a range of about 250-750 microns with a final injected 3D lens in a range of about 1000 to 2200 microns. Such lenses can be optically corrected with increased thickness and rigidity. In one embodiment, a back polymer layer of the lens is the same material as the injected material to provide good adhesion and reliability.

FIGS. 7a and 7b show cross-sectional views of the lenses according to the embodiments of the present invention comprising a polymeric material layer 400, polarizer layer 405 and retarder layer 410. FIG. 7a shows multiple polymeric material layers 405 (i.e. both sides of the polarizing layer 405) and FIG. 7b shows a single polymeric material layer 400.

Although the invention has been described in detail with reference to several embodiments, additional variations and modifications exist within the scope and spirit of the invention as described and defined in the following claims.

What is claimed is:

1. A method for constructing an optical element configured to decode three dimensional content, the method comprising:
    laminating one side of a polarizing layer with a first polymeric material layer to form an exposed side;
    laminating another side of the polarizing layer with a second polymeric material layer;
    laminating a retarder layer onto the exposed side of the first polymeric material layer to form a sheet;
    aligning the retarder layer with respect to the polarizing layer to decode a desired circular polarization;
    cutting a blank from the sheet; and
    curving the blank using a press polishing process to form an optical element.

2. The method of claim 1 wherein the optical element comprises a lens.

3. The method of claim 1 wherein the optical element is characterized by a thickness of about 750 to 1500 microns.

4. The method of claim 1 further comprising adding one or more thickness layers to the optical element using an injection molding process.

5. The method of claim 4 wherein the optical element and the one or more thickness layers are characterized by a combined thickness in a range of about 1000 to 2200 microns.

6. The method of claim 1 wherein the retarder layer comprises a norbornene copolymer resin.

7. The method of claim 1, wherein the retarder layer comprises cellulose triacetate (TAC).

8. A method for constructing an optical element configured to decode three dimensional content, the method comprising:
    laminating one side of a polarizing layer with a first polymeric material layer;
    laminating another side of the polarizing layer with a retarder layer to form a sheet;
    aligning the retarder layer with respect to the polarizing layer to decode a desired circular polarization;
    cutting a blank from the sheet; and
    curving the blank using a press polishing process to form an optical element.

9. The method of claim 8 wherein the optical element comprises a lens.

10. The method of claim 8 wherein the optical element is characterized a combined thickness in a range of about 250 to 750 microns.

11. The method of claim 8 further comprising adding one or more thickness layers to the optical element using an injection molding process.

12. The lens of claim 11 wherein the optical element and the one or more thickness layers are characterized by a combined thickness in a range of about 1000 to 2200 microns.

13. The method of claim 8 wherein the retarder layer comprises a norbornene copolymer resin.

14. The method of claim 8 wherein the retarder layer comprises cellulose triacetate (TAC).

* * * * *